United States Patent
Walraven

[11] 3,821,604
[45] June 28, 1974

[54] ARRANGEMENT FOR SYNCHRONIZING TWO SIGNALS

[75] Inventor: Anthonie Walraven, Emmasingel, Eindhoven, Netherlands

[73] Assignee: U.S. Philips Corporation, New York, N.Y.

[22] Filed: Dec. 26, 1972

[21] Appl. No.: 318,510

[30] Foreign Application Priority Data
Jan. 13, 1972  Netherlands ...................... 7200484

[52] U.S. Cl. .................. 317/5, 307/232, 318/313, 318/314
[51] Int. Cl. ............................................. H02p 5/00
[58] Field of Search ............... 317/5; 307/232, 233; 329/122, 126, 109; 318/313, 314, 318

[56] References Cited
UNITED STATES PATENTS

| | | | |
|---|---|---|---|
| 3,176,208 | 3/1965 | Gifft................................ | 318/314 |
| 3,206,665 | 9/1965 | Burlingham....................... | 318/314 |
| 3,478,178 | 11/1969 | Grace ............................... | 318/314 |
| 3,638,128 | 1/1972 | Downs.............................. | 329/126 |

*Primary Examiner*—William M. Shoop, Jr.
*Assistant Examiner*—Harry E. Moose, Jr.
*Attorney, Agent, or Firm*—Frank R. Trifari; Bernard Franzblau

[57] ABSTRACT

Arrangement for synchronizing a measuring signal produced by a controllable generator with a reference signal. For motor speed control the generator is a system which is coupled to the motor shaft and provides a measuring signal the frequency of which is a measure of the motor speed. The arrangement includes a four-position counter the count of which is increased one position by each reference pulse and is reduced one position by each measuring pulse. The arrangement further includes a sawtooth generator which provides a signal which is in synchronism with the reference signal and is applied to a logic circuit. This logic circuit is so controlled by the four-position counter as to provide an output signal which, after sampling at instants which correspond to the measuring pulses, produces a control signal which has an extreme value if the frequencies of the measuring and reference signals are different and has a value determined by the phase difference if the frequencies are equal. The great advantage of the arrangement is that the motor speed is adjustable over a wide range without stability problems arising.

15 Claims, 7 Drawing Figures

ARRANGEMENT FOR SYNCHRONIZING TWO SIGNALS

The invention relates to an arrangement for synchronizing and maintaining a measuring signal produced by a generator in phase with a reference signal, which arrangement comprises a control unit for controlling the generator, and a measuring circuit provided with a counter which has a first, a second, a third and a fourth position and to which both the measuring signal and the reference signal are applied as pulse trains and the count of which is reduced one position by each measuring pulse and is increased one position by each reference pulse. The measuring circuit delivers a first output signal for controlling the control unit, which signal has a first discrete value if the counter has reached the third or fourth position and a second discrete value if the counter has reached. The first or second position, the control unit is controlled by this first output signal from the measuring circuit so as to hold the control signal applied to the generator to a maximum value value if the counter continuously is in either of the count positions three and four, or alternates between these positions, or to minimum value if the counter continuously is in either of the positions one and two, or alternates between these positions, and to a control value which lies between the said minimum and maximum values and is determined by the phase difference between successive measuring and reference pulses if the counter alternates between the second and third positions.

Such an arrangement has a wide field of application. An example of a first application is synchronizing and holding in phase a signal generated by a voltage-controlled oscillator (VCO), i.e. a measuring signal, and an incoming reference signal, which system is generally referred to as a "phase-locked loop". A second very important application is a servo system. If both the number of revolutions, or speed, of a motor drive and the phase of the driven shaft are to be controlled with a high degree of accuracy, as is the case, for example, in the drive of an instrumentation recorder, in general an alternating voltage signal is generated which per revolution of the motor shaft has a fixed number of cycles. The frequency and the phase of this measuring signal then are compared with the reference signal, and the motor speed is adjusted by means of the error signal. Thus, in this type of system the ultimate object is not to synchronize the measuring signal with the reference signal but to synchronize the motor speed, represented by the measuring signal, with the said reference signal.

An arrangement of the type defined at the beginning of this specification used in a motor control is described, for example, in the report of a conference held in London, July 6 to July 10, 1964, "International Conference on Magnetic Recording", which was organized by "The I.E.E. Electronics Division". Page 126 of this report shows such an arrangement in which the output signal of the measuring circuit is applied to a sawtooth generator in a manner such that a sawtooth voltage of fixed slope is started at the instants at which the output signal from the measuring circuit passes from a first discrete value to a second discrete value, this sawtooth voltage decaying at the instants at which the output signal from the measuring circuit returns from the second discrete value to the first discrete value. Thus the level reached by the sawtooth voltage is a measure of the phase difference between successive measuring and reference pulses and hence may be used to control the energy to be applied to the rotating system. Because this sawtooth voltage naturally has a direct-voltage level on which a large ripple is superimposed, which in general is undesirable for a control signal, this sawtooth voltage generally is sampled shortly before the fly-back of the sawtooth, i.e. at instants which approximately correspond to the reference pulses, the sampled values of the signal being stored in a holding circuit. Thus the control signal obtained is a stepped curve, the voltage value associated with each stop corresponding to the value of the sawtooth voltage shortly before the fly-back, measured during the last preceding reference pulse.

An arrangement of such design for synchronizing and holding in phase a rotating system may exhibit a particularly advantageous control behaviour, which is most advantageous if the sweep time of the sawtooth is equal to the period of the reference pulse train.

If, however, the speed of a rotating system is to be adjustable over a large range, as is the case, for example, in instrumentation recorders in which, in general, a speed range from 1 to 128 is desired, substantial problems arise because a change of speed is obtained by changing the frequency of the reference pulse train. However, the means that the period of this reference pulse train changes with resect to the sweep time of the sawtooth voltage since the latter is constant. As a result, the direct-current gain of the opened phase loop varies upon a variation of the speed set, which may give rise to considerable stability problems.

The said difficulties may obviously be avoided if in changing over the frequency of the reference pulse train, simultaneously the sweep time of the sawtooth voltage is changed over to the appropriate value. It will be apparent that this change over can only be performed automatically, i.e. by a single operation, if the reference pulse train is generated internally of the arrangement. If, however, it should be possible to derive the reference pulse train from an external source, additional matching of the sweep time of the sawtooth voltage will be required.

It is an object of the present invention to provide an arrangement which has the same favourable control behavior as the afore described known arrangement, but does not given rise to the said stability problems on variation of the frequency of the reference signal.

For this purpose the invention is characterized in that the control unit includes a sawtooth generator which supplies a sawtooth signal which is in synchronism with the reference signal and has the same frequency and the extreme values of which lie between the first and second discrete values and which varies in a direction which corresponds to that from the second to the first discrete values, the control unit further including a logic circuit which has a first input and a second input to which the signal from the sawtooth generator and the first output signal from the measuring circuit are applied and which is designed so that its output signal corresponds to the first discrete value if the first output signal from the measuring circuit has assumed this first discrete value, and to the value of the sawtooth signal if the first output signal from the measuring circuit has assumed the second discrete value, which output signal from the logic circuit may be used as a control signal for the generator.

Because the amplitude of the sawtooth voltage generated is constant and its slope is varied by means of the control loop in accordance with the reference pulse train, a sawtooth voltage is automatically obtained the sweep time of which is equal to the period of the reference pulse train. Deriving a signal representative of the phase difference between the reference pulses and the measuring pulses requires the use of an OR circuit the output signal from which at any instant corresponds to the larger of the signals applied to its two inputs. The mean value of this signal may then be used as the control signal.

To permit a larger swing of the control voltage, an embodiment of the arrangement according to the invention is characterized in that the logic circuit has a third input to which a second output signal from the measuring circuit is applied, which second output signal has a third discrete value if the counter is in the first count position, and a fourth discrete value if the counter is in one of the other count positions, the signal supplied by the sawtooth generator lying between these third and fourth discrete values. However if the signal at the third input has the third discrete value the output signal from the logic circuit is clamped to this third discrete value.

This embodiment has the particular advantage that by sampling the output signal from the AND gate at instants which correspond to the control pulses a ripple-free control voltage is obtained for the rotating system.

Embodiments of the invention will now be described, by way of example, with reference to the accompanying diagrammatic drawings, in which.

Figure 3:
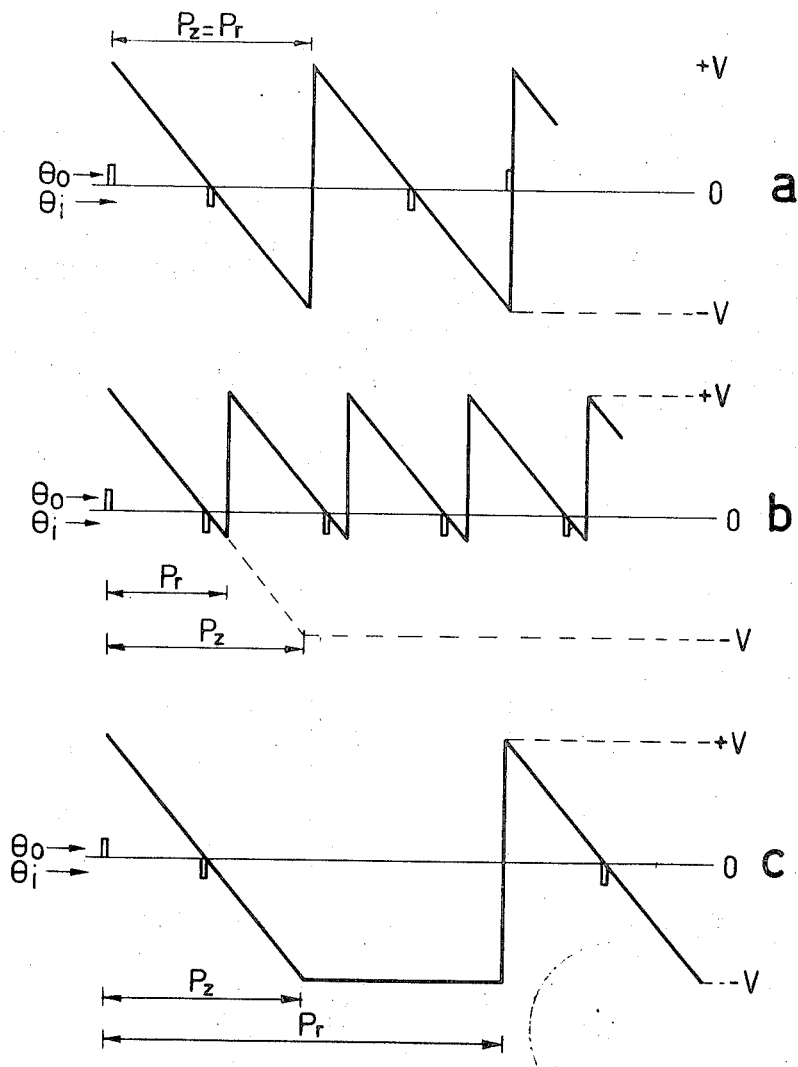
Figure 4:
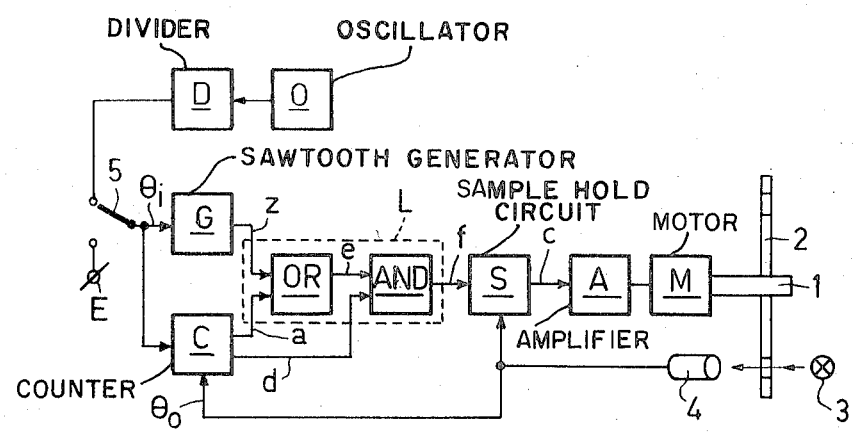
Figure 6:
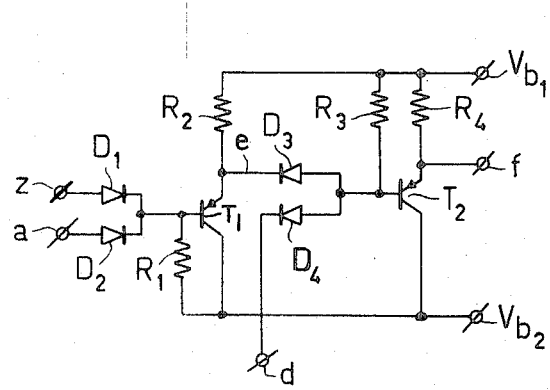
Figure 7:
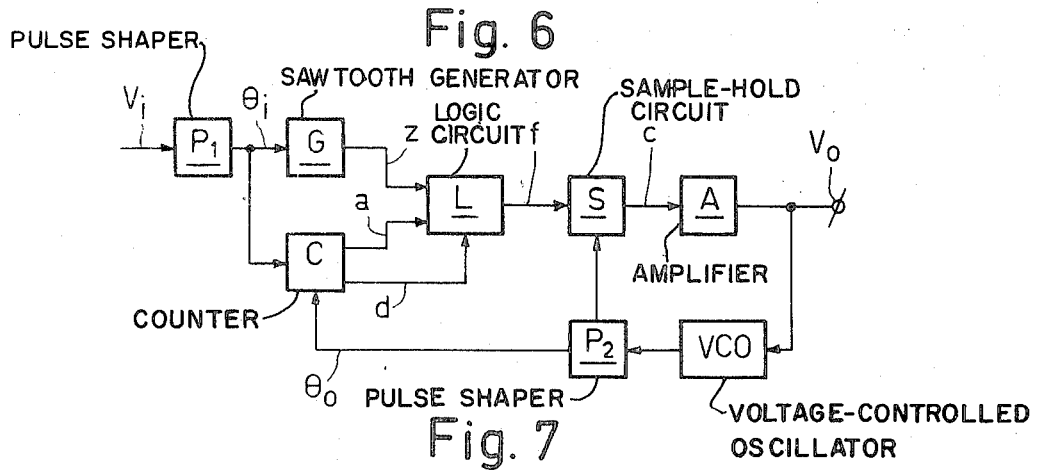
Figure 5:
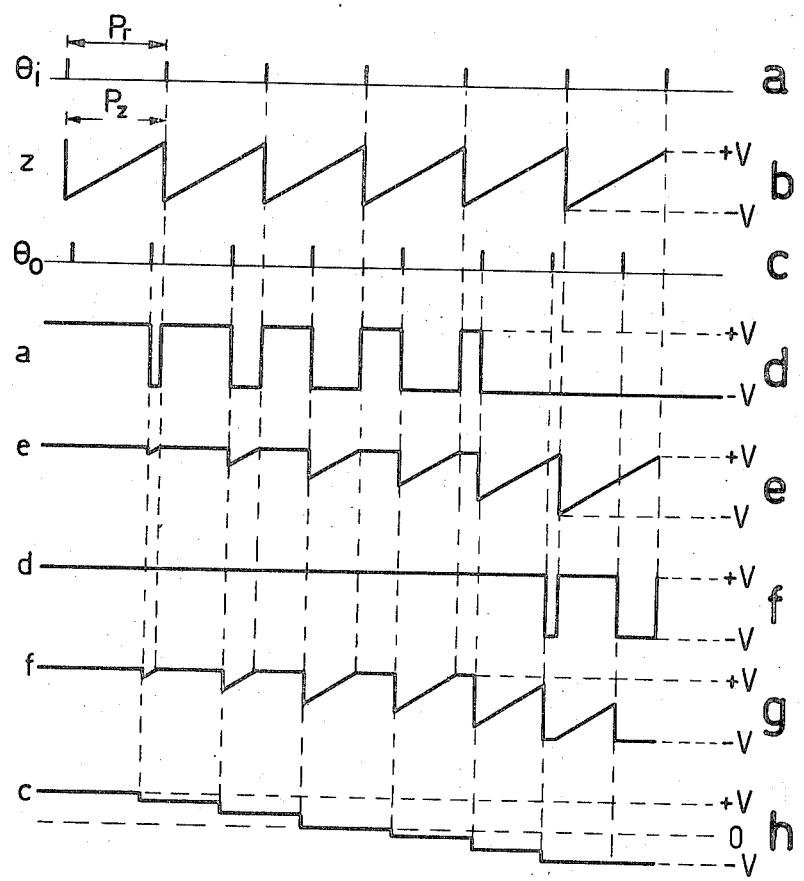

FIG. 3 shows schematically the control behaviour of this known arrangement at different frequencies of the reference pulse train, FIG. 4 shows schematically an embodiment of the synchronizing arrangement according to the invention, which is also used in a motor control, FIG. 5 shows the voltage waveforms which occur in this arrangement, FIG. 6 shows an embodiment of the OR and AND gates used in the arrangement of FIG. 4 and FIG. 7 shows the synchronizing arrangement used in a phase-locked loop.

Figure 1:
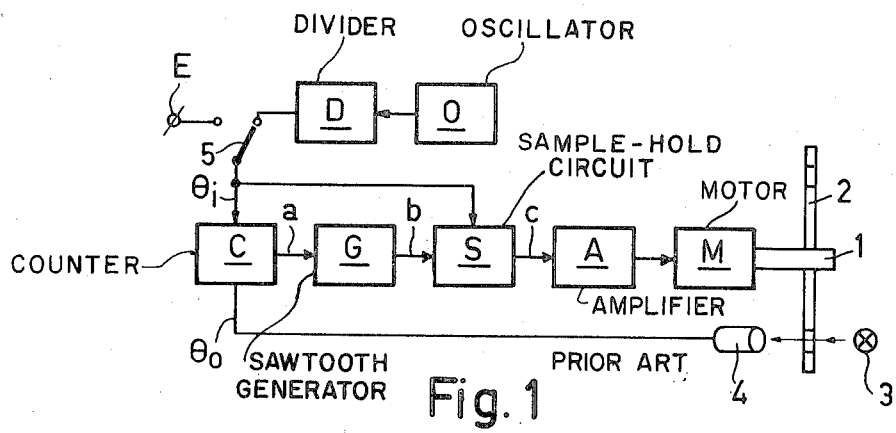
FIG. 1 shows the known synchronizing arrangement used in a motor control.

FIG. 1 shows a known phase-control system, for example, for speed control of a motor M. The system first comprises a perforated disc 2 mounted on a shaft 1 of the motor M. By means of this disc 2, a source of light 3 and a photo detector 4, a measuring signal $\theta_o$ is obtained, the repetition frequency of which is a measure of the speed of the motor.

This measuring signal $\theta_o$, which is a pulse train, is compared in a measuring circuit C with a reference pulse train $\theta_i$ which, by way of a divider circuit D, is derived, for example, from a crystal oscillator O and is a measure of the desired motor speed. This reference pulse train $\theta_i$ may alternatively be derived from an external source E by changing over a switch 5.

The measuring circuit C comprises a bidirectional 4-position counter, the count of which is increased one position by each $\theta_i$ pulse and is reduced one position by each $\theta_o$ pulse. The counter is arranged so that it cannot be driven into a position lower than "1" or higher than "4". This counter may, for example, be a four-bit shift register in which a standard logic signal, for example, a logical "1", is shifted one bit in one direction by a $\theta_i$ pulse and is shifted one bit in the opposite direction by a $\theta_o$ pulse. The position of this logical "1" in the register then provides the desired information, i.e. the count of the counter. Alternatively, the counter may comprise two flip-flops and some logic gates.

The said information is read out by means of a logic circuit included in the measuring circuit in a manner such that the output signal $a$ from the measuring circuit C has one of two possible discrete signal values, for example, +V and 0. The one signal value, +V, is produced if the count of the counter is "3" or "4", and the other signal value, 0, is produced if the count of the counter is "1" or "2". For this purpose, for example, in the four-bit shift register the first two bit outputs may be connected to an OR gate from the output of which the desired signal $a$ may then be taken.

This output signal $a$ from the measuring circuit C serves as a gating signal for a sawtooth generator G, for example, a Miller generator, which provides a sawtooth voltage of constant slope which is started and stopped in accordance with the output signal $a$ from the measuring circuit. The output signal $b$ from this sawtooth generator is periodically measured and held by means of a sample-hold circuit S, the sampling instants coinciding with the reference pulse $\theta_i$. The output signal $c$ from this sample-hold circuit S controls the motor M via a servo amplifier A.

Figure 2:
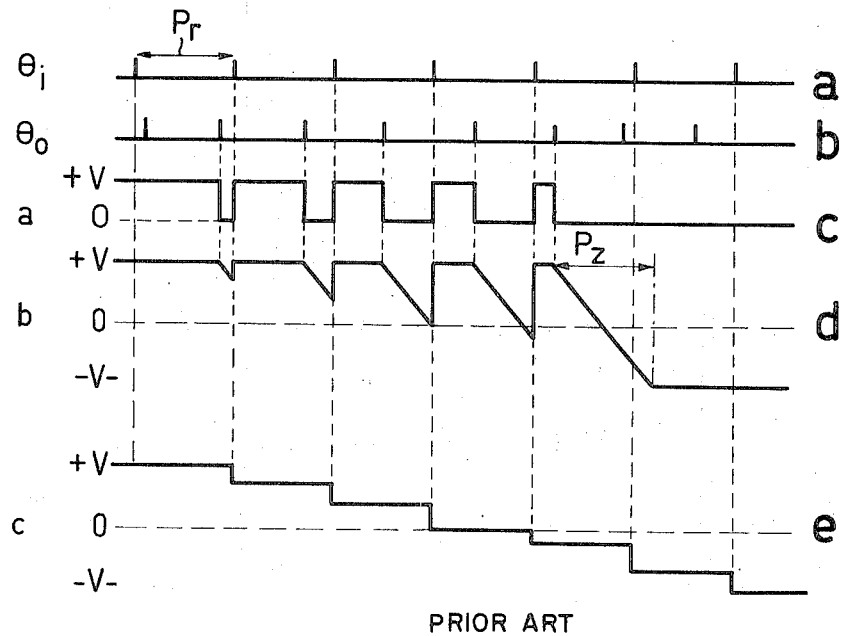
FIG. 2 shows the voltage waveforms which occur in this arrangement.

To clarify the operation of the control system FIG. 2 shows the relationship between the various voltages which occur in the system, the reference letters of this Figure referring to those points in the control system of FIG. 1 which are designated by corresponding letters.

It is assumed that the motor has started from a stationary position. The four-position counter of the measuring circuit C then will be in the position "3" or "4" as long as the desired speed has not been reached, because during starting, a large number of reference pulses $\theta_i$ will occur between two successive control pulses $\theta_o$, so that the counter sticks in the position "4" and is briefly switched to the position "3" only when a $\theta_o$ pulse appears. Consequently during the starting operation of the motor the output signal $a$ from the measuring circuit C is continuously equal to +V, which corresponds to a counter position "3" or "4". Even if after some time the $\theta_i$ pulses and the $\theta_o$ pulses appear alternately and hence the desired speed is actually reached, this situation persists because the counter switches back and forth between the positions "3" or "4".

A change over of the output signal $a$ to the other discrete value "0" is produced only if two $\theta_o$ pulses appear in succession, for this causes the count of the counter to be reduced by two positions i.e. from "4" to "2". However, this count "2" is associated with the output signal 0 so that the output signal $a$ from the measuring circuit becomes 0 at the appearance of the second $\theta_o$ pulse.

If subsequently a $\theta_i$ pulse and a $\theta_o$ pulse appear alternately, the count alternates between "3" and "2" so that the output signal $a$ from the measuring circuit C alternates between +V and 0. It will readily be appreciated that the pulse width of this square-wave output signal $a$ then is a measure of the phase difference between the $\theta_i$ pulses and the $\theta_o$ pulses.

If, at a given instant, for some reason the motor speed becomes too high, i.e. if two successive $\theta_o$ pulses appear again after the motor has been running at the desired speed, the count is again reduced two positioned, but now from the position "3", so that it becomes "1". If then $\theta_i$ pulses and $\theta_o$ pulses again appear alternately, the count alternates between "2" and "1" so that the output signal $a$ continuously remains 0 until the motor speed has fallen to a degree such that two $\theta_i$ pulses appear in succession.

This output signal $a$ from the measuring circuit C so controls the sawtooth generator G that the output voltage $b$ from this generator, which in the quiescent condition is equal to +V, starts to decrease linearly at instance which correspond to the descending edges of the signal $a$, and is returned to +V at the appearance of the ascending edges of this signal $a$. Consequently, if the signal $a$ is a square-wave signal, the output signal $b$ from the sawtooth generator is a sawtooth voltage, the amplitude of the sawtooth being determined by the phase difference between the $\theta_i$ pulses and the $\theta_o$ pulses. After the last square-wave pulse the sawtooth voltage sticks at −V, after which the output voltage $b$ remains at this value.

This output voltage $b$ may, as the case may be after smoothing, be used directly as a control signal for the motor. However, a much more elegant method consists in periodically measuring the value of this output voltage $b$ and holding the measuring value by means of a sample-hold circuit S. Sampling is effected at instants which coincide with the reference pulses $\theta_i$. This provides the waveform shown of the voltage $c$ to be applied to the servo amplifier A.

The control unit shown ensures a phase control behaviour having a high degree of accuracy. However, in the example shown it is assumed that the sweep time $P_z$ of the sawtooth voltage, i.e. the time which the voltage $b$ requires to drop from +V to −V, is equal to the pulse spacing $P_r$ of the reference pulse train.

In some uses of such a control system, however, the speed of the motor is to be adjustable to a plurality of values which may be widely different. For example, in instrumentation recorders generally eight speeds are desired, the highest speed being, for example, 128 times the lowest speed. If, however, a plurality of widely different speeds are to be adjustable by means of the known control system, this means that for one speed only the pulse spacing $P_r$ is equal to the sweep time $P_z$ of the sawtooth voltage and that for other speeds large differences occur between the said quantitites, because the sweep time $P_z$ of the sawtooth is constant and the pulse spacing $P_r$ is directly determined by the speed set. However, these differences between $P_z$ and $P_r$ provide serious problems, as will be explained with reference to FIG. 3.

FIG. 3$a$ shows schematically a situation in which the motor speed is controlled so as to have the desired value when the sweep time $P_z$ of the sawtooth is equal to the spacing $P_r$ of the reference pulse train $\theta_i$, which situation corresponds to that illustrated by FIG. 2. In this situation the $\theta_o$ pulses will lie exactly midway between two successive $\theta_i$ pulses, for in the balanced condition the $\theta_i$ pulses lie at points which correspond to the zero crossings of the sawtooth voltage, because then the control voltage sampled at these instants and transmitted to the motor is zero.

FIG. 3$b$ illustrates the situation in which the motor speed is controlled so as to have the desired value when the pulse spacing $P_r$ of the reference pulse train $\theta_i$ is smaller than the sweep time $P_z$ of the sawtooth, i.e. if a higher speed is set than in the situation illustrated by FIG. 3$a$. Again, the $\theta_i$ pulses lie at locations which correspond to the zero crossings of the sawtooth voltage. However, the spacing between a $\theta_o$ pulse and a $\theta_i$ pulse now exceeds ½ $P_r$, owing to the difference between $P_r$ and $P_z$. It will readily be appreciated that no control is possible anymore if $P_r < ½ P_z$, because in this case the sawtooth voltage remains positive and hence has no zero crossings. This means that the pulse repetition frequency of the pulse train $\theta_i$ can at most be twice the frequency which corresponds to the sweep time $P_z$ of the sawtooth, so that the speed which can be set has an upper limit which corresponds to this pulse repetition frequency.

FIG. 3$c$ shows the situation in which the motor speed has been adjusted to the desired value when the pulse spacing $P_r$ of the reference pulse train $\theta_i$ is greater than the sweep time $P_z$ of the sawtooth. Consequently the saw-tooth voltage bottom each time at its minimum value −V. The Figure shows that the pulse repetition frequency of the pulse train $\theta_i$ may be made arbitrarily small and hence $P_r$ may be made arbitrarily large without the control action being lost, for the sawtooth voltage always keeps zero crossings.

From the foregoing it may be expected that any speed range is possible by making the sawtooth frequency, that is to say the frequency which corresponds to the sweep time $P_z$, at least equal to one half of the maximum pulse repetition frequency of the pulse train $\theta_i$ which corresponds to the maximum speed. If, for example, the pulse repetition frequency $f_{max} = 128\, f_{min}$, in principle the entire speed range may be covered by making $1/P_z$ equal to 64 $f_{min}$.

However, from FIG. 3$c$ it will be evident that for low speeds the control range becomes very small because the sweep time $P_z$ then is very small compared with the pulse spacing $P_4$ (at a minimum 1/64 $P_r$). A second and far more inconvenient effect is due to the fact that the ratio $P_z/P_r$ depends upon $P_r$ and hence upon the speed set. As a result the loop amplification produced in the control system depends upon the speed set. It will be appreciated that this is detrimental to the stability of the system, which has to be carefully watched in any case. Consequently it is very difficult to cover a large speed range by means of the known system without instabilities being produced at given speeds.

In contrast therewith, the embodiment of the control system according to the invention shown in FIG. 4 has a substantially unlimited adjusting range without stability problems arising. Corresponding elements are designated by the same reference symbols as in FIG. 1. The voltages produced in the control system are shown in FIG. 5.

The control system again includes a perforated disc 2 mounted on a motor shaft 1 of a motor M, a source of light 3 and a photodetector 4 which produce a pulse train $\theta_o$ which represents the motor speed. Obviously systems other than an optical system, for example, magnetic or capacitive systems, may be used to provide a signal which is representative of the motor speed. The control system again comprises an oscillator O and a divider stage D which provides a reference pulse train $\theta_i$ which also may be taken from an external source E via a switch 5.

This reference pulse train $\theta_i$ is applied to a sawtooth generator G which, however, in this embodiment is adapted to be synchronized over a large frequency range by means of an internal phase control loop. Because this generator is synchronized to the reference pulses $\theta_i$, the fly-back of the sawtooth voltage $z$ obtained is coincident with the $\theta_i$ pulses, irrespective of the reference frequency, while the sawtooth amplitude remains constant over the entire reference frequency range. In FIG. 5 it is assumed that the sawtooth voltage extends from $-V$ to $+V$.

The reference pulse train $\theta_i$ and the motor pulse train $\theta_o$ again are applied to a measuring circuit C which is substantially identical to that shown in FIG. 1 and thus includes a four-position counter. This measuring circuit C again provides a first output signal $a$ which entirely corresponds to the output signal $a$ shown in FIG. 2, with the difference that the discrete voltage values now are $+V$ and $-V$. However, the measuring circuit C also provides a second output signal $d$ which also has the discrete voltage values $+V$ and $-V$. The output signal $d$ is $+V$ if the count of the four-position counter is equal to "4", "3" or "2", and $-V$ if the count is "1".

The output signal $z$ from the sawtooth generator G and the output signal $a$ from the measuring circuit C are applied to an OR gate which forms part of a logical circuit L and delivers a signal $e$ which at any instant is equal to the larger of the two signals $a$ and $z$. The signal $e$ may be used, after smoothing, if necessary as a control signal for the motor M. The mean value of this signal $e$ lies between the limits $+V$ and 0.

However, in order to increase the signal range of the control voltage the signal $e$ is applied, as is the output signal $d$ from the measuring circuit, to an AND gate which also forms part of the logical circuit L. Hence, the output signal $f$ from the AND gate at any instant is equal to the smaller of the two signals $e$ and $d$, resulting in a signal $f$ having the form shown in FIG. 5. As will readily be seen from the Figures, the mean value of the signal $f$ lies between the limits $+V$ and $-V$ so that the signal range is double. A far more important advantage is, however, that a substantially ripple-free control signal of the desired form is obtainable by applying the signal $f$ to a sample-hold circuit. In this circuit the voltage $f$ now is not sampled at instants which coincide with the $\theta_i$ pulses, but at instants which coincide with the $\theta_o$ pulses, resulting in a voltage $c$ which has the form shown in the Figure and is applied to the servo amplifier A. In actual fact the sampling instants will be slightly delayed, because otherwise the steep edge of the sawtooth would be sampled. To avoid this, there may be connected in the lead by which the $\theta_o$ pulses are applied to the sample-hold circuit a delay element, so that the sampling instants are slightly delayed with respect to the $\theta_o$ pulses. The waveform of the control signal $c$ shows that the control action obtained is entirely identical to that obtained in the arrangement shown in FIG. 1.

However, compared with the arrangement shown in FIG. 1, the arrangement shown in FIG. 4 has the important advantage that the pulse repetition frequency of the reference pulse train $\theta_i$ may have any desired value without giving rise to the stability problems which rise in the known arrangement, for the sweep time $P_z$ of the sawtooth voltage $z$ always is equal to the pulse spacing $P_r$ of the reference pulse train $\theta_i$, irrespective of the frequency and hence irrespective of the speed set. Hence, irrespective of the speed set, in the balanced condition a control corresponding to the situation shown in FIG. 3a will always be obtained, i.e. a control in which in the balanced condition $\theta_o$ pulses lie midway between be $\theta_i$ pulses, which is advantageous with respect to the capture range of the control system. The most important advantage of the arrangement, however, is that the direct-current gain of the open phase control loop is constant, i.e. independent of the speed set, so that a designed stable system remains stable under any conditions, i.e. at any speed.

Instead of a sawtooth voltage $z$ having the shape shown in FIG. 5 and rising from $-V$ to $+V$, a sawtooth voltage of inverse form, i.e. running down from $+V$ to $-V$ may be used. In this case, however, the polarities of the discrete values of the two output signals must also be interchanged, the first and fourth discrete values becoming $-V$ and the second and third discrete values becoming $+V$. The control signal $c$ then will be inverted with respect to the signal $c$ shown in FIG. 5, i.e. a signal which ascends from $-V$ to $+V$. This signal may be applied to the motor by way of an inverter, but may obviously also directly be used to energize a brake mounted on the motor shaft.

Although with respect to the voltage waveforms of FIG. 5 it is assumed that the sqaure-wave voltages $a$ and $d$ and the sawtooth voltage $z$ vary between the same limit values $+V$ and $-V$, this is not absolutely necessary. To ensure phase control it is only necessary for the sawtooth signal to have extreme values which lie both between the first and second discrete values and between the third and fourth discrete values. However, to avoid sudden signal jumps in the control signal when passing from frequency control, i.e. with a counter position which continuously is three or four or continuously is one or two, to phase control, i.e. with a counter position alternating between two and three, the initial value of the sawtooth signal should correspond to the third discrete value and its final value should correspond to the first discrete value.

FIG. 5 further shows that the order of succession of the OR and AND gates is arbitrary. Thus, the sawtooth voltage $z$ together with the second output signal $d$ from the measuring circuit C may be applied to the AND gate and the output signal from this AND gate together with the first output signal from the measuring circuit C may be applied to the OR gate, the desired signal $f$ appearing at the output of this OR gate.

FIG. 6 shows an embodiment of the logical circuit L of FIG. 4 which comprises the combination of an OR gate and an AND gate. The OR gate comprises a transistor $T_1$ and resistors $R_1$ and $R_2$. The input signals $z$ and $a$ are applied to the anodes of diodes $D_1$ and $D_2$ respectively, the cathodes of which are connected to the base of the transistor $T_1$. The output signal $e$ from this OR gate is applied to the cathode of a diode $D_3$ the anode of which is connected to the base of a transistor $T_2$. The second input signal $d$ for this AND gate is applied to the cathode of a diode $D_4$ the anode of which is also connected to the base of the transistor $T_2$. A base resistor $R_3$ and an emitter resistor $R_4$ complete the transistor circuit. The output signal $f$ from the AND gate is taken from the emitter of the transistor $T_2$.

FIG. 7 shows an embodiment of a phase-locked loop provided with an arrangement according to the invention. The reference pulse train is derived from an input signal $V_i$ by means of a pulse shaper $P_1$. This pulse shaper may, for example, detect the zero crossings of the input signal $V_i$ and deliver corresponding pulses. The generator which generates the measuring signal here comprises a voltage-controlled oscillator which is controlled by the control signal $V_o$, which also may be the output signal. The measuring pulses $\theta_o$ are derived from the output signal of the oscillator by means of a pulse shaper $P_2$. The two pulse trains $\theta_i$ and $\theta_o$ are handled in the frequency and phase measuring circuit in a manner identical to that described with reference to FIG. 4, so that ultimately the desired control signal $c$ is obtained which by way of an amplifier A is applied to the oscillator.

What is claimed is:

1. Apparatus for synchronizing and maintaining a measuring signal produced by a generator in phase with a reference signal comprising a control unit for controlling the generator, and a measuring circuit including a counter which has a first, a second, a third and a fourth count position, means for applying to the counter both the measuring signal and the reference signal each in the form of pulse trains so that the count in the counter is reduced one position by each measuring pulse and is increased one position by each reference pulse, the measuring circuit delivering a first output signal for controlling the control unit, said output signal having a first discrete value if the counter has reached the third or fourth position and a second discrete value if the counter has reached the first or second position, which first output signal from the measuring circuit so controls the control unit that it holds a control signal applied to the generator to a maximum value if the counter remains continuously in either of the positions three or four, or alternates between these positions, to a minimum value if the counter remains continuously in either of the positions one or two, or alternates between these positions, and to a value intermediate these minimum and maximum values and determined by the phase difference between successive measuring and reference pulses if the counter alternates between the second and third positions, characterized in that the control unit includes a sawtooth generator which supplies a sawtooth signal which is in synchronism with the reference signal and has the same frequency and the extreme values of which lie between the first and second discrete values and which varies in a direction which corresponds to the direction from the second discrete value to the first discrete value, and the control unit further includes a logic circuit having a first input and a second input to which the signal from the sawtooth generator and the first output signal from the measuring circuit are applied and which includes means for deriving an output signal that corresponds to the first discrete value if the first output signal from the measuring circuit has assumed said first discrete value, and to the value of the sawtooth signal if the first output signal from the measuring circuit has assumed the second discrete value, which output signal from the logic circuit may be used as the control signal for the generator.

2. Apparatus as claimed in claim 1, characterized in that the logic circuit has a third input to which a second output signal from the measuring circuit is applied, which second output signal has a third discrete value if the counter is in the first position and a fourth discrete value if the counter is in any of the other positions, the sawtooth from the sawtooth generator lying between these third and fourth discrete values, and when the signal at the third input has the third discrete value the output signal from the logic circuit is clamped to said third discrete value.

3. Apparatus as claimed in claim 2, characterized in that the control unit includes a sampling circuit connected to receive the output signal from the logic circuit and which samples and measures the value of this signal at instants which correspond at least substantially to the occurence of the measuring pulses and holds each measured value until the next sampling instant.

4. Apparatus as claimed in claim 2 wherein the sawtooth generator is arranged to produce a sawtooth voltage that always commences with a value which corresponds to the third discrete value and terminates with a value equal to the first discrete value.

5. Apparatus as claimed in claim 1 for contolling the speed of a motor wherein the generator is coupled to the motor shaft and delivers a measuring signal the frequency of which is a measure of the motor speed, and means for applying the control signal to the motor for controlling the motor speed.

6. Apparatus as claimed in claim 1 wherein the generator comprises a voltage-controlled oscillator having a control input to which the control signal is applied.

7. Apparatus as claimed in claim 2 wherein, the logic circuit comprises the series connection of an OR gate and an AND gate which each have two input terminals which together form the three inputs of the logic circuit.

8. Signal synchronizing apparatus comprising, a source of reference pulses, a signal generator for producing a train of signal pulses to be locked in phase with said reference pulses, a reversible counter circuit having four count positions and first and second inputs for increasing and decreasing, respectively, the count in the counter, means for applying said reference pulses and said signal pulses to said counter first and second inputs, respectively, said counter circuit having an output providing an output signal having a first value in the third or fourth positions of the counter and a second value in the first or second counter positions, and a control unit comprising, a sawtooth generator synchronized with the reference pulses and supplying a sawtooth signal of the reference pulse frequency having extreme amplitude values which lie between said first and second values, and a logic circuit having first and second inputs coupled to receive the sawtooth signal and the counter output signal, respectively, and including means responsive to the sawtooth signal and output signal for deriving a control signal that is determined by the phase difference between the reference pulses and the signal pulses.

9. Apparatus as claimed in claim 8 wherein said logic circuit includes gating means for deriving a control signal of a fixed amplitude corresponding to said first value when the counter supplies an output signal of said first value and to the value of the sawtooth signal when the counter supplies an output signal of said second value.

10. Apparatus as claimed in claim 8 wherein the control unit further comprises a sample and hold circuit coupled to receive the signal output of the logic circuit and synchronized by the signal pulses to sample the logic circuit output signal at substantially those instants of time when the signal pulses occur.

11. Apparatus as claimed in claim 8 wherein said logic cicuit includes an OR gate having first and second inputs coupled to receive the sawtooth signal and the counter output signal, respectively.

12. Apparatus as claimed in claim 11 wherein the logic circuit further comprises an AND gate with one input coupled to the OR gate output and a second input coupled to a second output of the counter circuit which supplies a second output signal having a third value when the counter is in the first position and a fourth value when the counter is in the second, third or fourth positions, the output signal of the AND gate being clamped to said third value when the counter circuit supplies said third value output signal to the second input of the AND gate.

13. Apparatus as claimed in claim 12 wherein the control unit further comprises a sample and hold circuit coupled to receive the signal output of the AND gate and synchronized by the signal pulses to sample the AND gate output signal at substantially those instants of time when the signal pulses occur.

14. Apparatus as claimed in claim 8 for controlling the speed of a motor wherein the signal generator is controlled by the motor shaft to deliver signal pulses at a frequency determined by the motor speed, and means for applying the control signal to the motor to control the speed thereof.

15. Apparatus as claimed in claim 8 wherein the signal generator comprises a voltage-controlled oscillator having a control input coupled to receive the control signal and an output circuit for supplying said signal pulses to the second input of the counter.

* * * * *